UNITED STATES PATENT OFFICE.

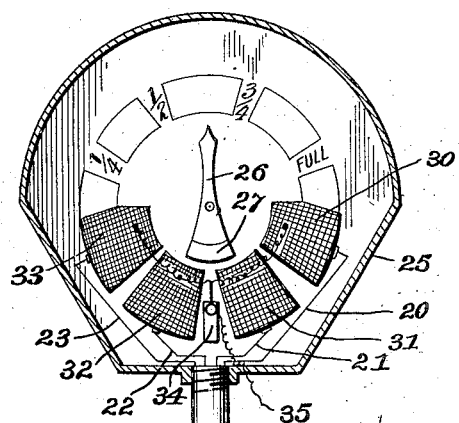
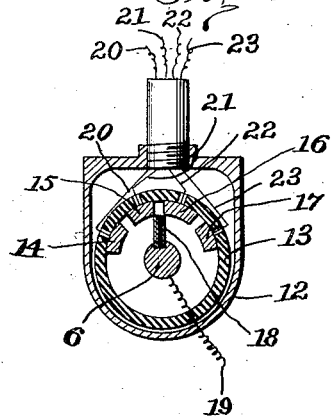
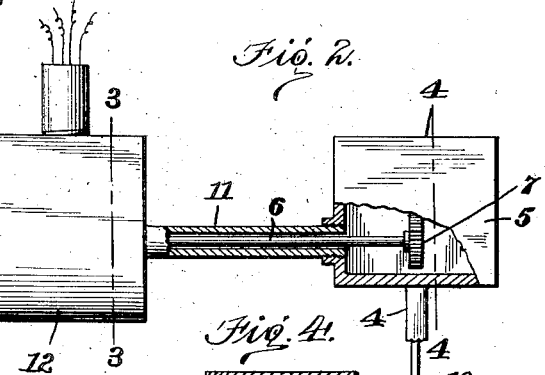
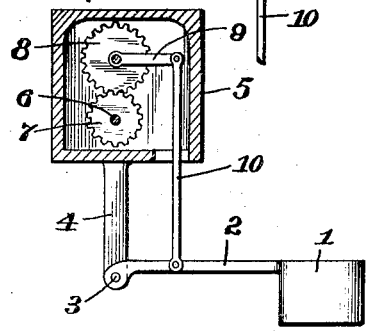
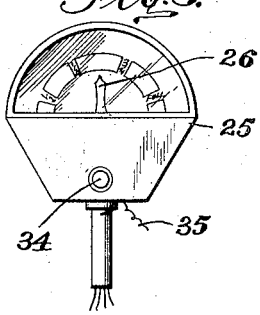

JOSEPH BEN. FAULKNER, OF CARTERSVILLE, GEORGIA.

GASOLENE-TANK INDICATOR.

1,372,222.   Specification of Letters Patent.   Patented Mar. 22, 1921.

Application filed November 21, 1919. Serial No. 339,554.

*To all whom it may concern:*

Be it known that I, JOSEPH BENJAMIN FAULKNER, a citizen of the United States, residing at Cartersville, in the county of Bartow, State of Georgia, have invented certain new and useful Improvements in Gasolene-Tank Indicators, of which the following is a description, reference being had to the accompanying drawings, forming a part hereof.

My invention relates to float indicators for indicating at a distance the height of liquid in a tank and relates particularly to devices of this character for indicating on the dash or instrument board of an automobile the amount of gasolene in the gasolene tank so that the driver of the automobile may know at any time the quantity of gasolene available for use without the necessity of actual inspection of the tank. My invention has for its object to provide a device for this purpose which will be simple and inexpensive to construct, may be readily attached to any automobile and will be effective to accurately indicate the amount of gasolene on hand at any time.

With the above explained objects in view my invention consists in the construction and combination of elements hereinafter described and claimed.

In the drawings Figure 1 is view in elevation of the indicating device of my invention with the front or cover glass and dial removed to show the operating parts.

Fig. 2 is a side view partly in section of the indicator controlling means located at the gasolene tank.

Fig. 3 is a vertical sectional view on line 3—3 of Fig. 2.

Fig. 4 is a vertical sectional view on line 4—4 of Fig. 2, and

Fig. 5 is a front elevation of the indicating device as it appears on the dash or indicating board.

In the drawings 1 indicates a float carried by an arm 2 pivoted at 3 to a post 4 adapted to extend downward into the gasolene or other tank from a box 5. Within the box 5 is arranged a shaft 6 carrying a gear 7 which meshes with a gear 8 on which is secured a radial arm 9 the outer end of which is connected by a link 10 with the arm 2 which carries the float 1. The shaft 6 extends through the side of box 5 and, within a pipe 11, to a second box 12. Within this second box 12 is arranged a short tube 13 of insulating material having on its interior a series of contact blocks 14, 15, 16, and 17 here shown as four in number though a greater or smaller number may be used. A contact brush 18 carried by the shaft 6 is adapted to make contact with any of the contact blocks according to the position to which the shaft 6 is rotated as hereinafter described. From each of the contact blocks 14, 15, 16, and 17 a wire leads to the indicator these wires being marked respectively 20, 21, 22, and 23. A pipe 24 preferably extends from the box 12 to the indicator to protect the wires from injury. A wire 19 leads to the shaft 6 from any convenient source of electric current.

The indicator casing 25 preferably of the form shown in Figs. 1 and 5 is adapted to be carried on the instrument board. This indicator casing has within it a suitably marked dial and preferably has a glass front. Pivoted within it is an indicator needle 26 suitably balanced and having at its lower end an armature 27. In the lower half of the indicator casing is arranged a series of electromagnets 30, 31, 32, and 33 corresponding in number with the contact blocks above described one end of the winding of each electromagnet being connected by a wire with a contact block, 30 being connected by wire 20 with contact block 14, 31 being connected by wire 21 with contact block 15, 32 by wire 22 with contact block 16, and 33 by wire 23 with contact block 17. The other ends of the windings of these electromagnets are all connected to one terminal of a push button switch 34 and the other terminal is connected by wire 35 to the source of current to which wire 19 is connected.

The height of the liquid in the gasolene tank determines the position of the float 1, the float gradually dropping as the gasolene is used up and, of course rising as a fresh supply of gasolene is poured into the tank. As the float moves up or down it will through the arm 2 and link 10, rotate the gear 8 which in turn rotates the gear 7 and with it the shaft 6. As the shaft 6 rotates its brush 18 is brought successively in contact with the contact blocks closing circuit through them and their respective wires with the electromagnets in the indicator casing, the circuit, however not being complete so long as the switch 34 remains open. On pressing the button to close this switch the circuit is completed from the source of current through wire 19, shaft 6, brush 18, one of the contact blocks, its wire and the winding of an electromagnet, thus energizing that electromagnet and causing it to attract the armature 27 and swing the needle 26 to a position corresponding to the position of the float thus showing how much gasolene there is in the tank.

While the invention has been above described as particularly adapted and intended for use with a gasolene tank on an automobile it is not intended to limit it to such use as it is adapted for use in indicating the amount of liquid in any tank or vessel and may be used with water tanks or any other tanks, the indicator being located at any desired distance from the tank.

Having thus described my invention what I claim is;

A float actuated circuit closer comprising a gear, a radial arm carried by the gear, a lever fulcrumed at one end and provided with a float at its free end, a link pivotally connected at one end to the radial arm and at the other end to the lever between its ends, a shaft in circuit with a source of current provided with a gear in mesh with the first mentioned gear, a brush carried by the shaft, and a series of contacts in the path of movement of the brush.

In testimony whereof I affix my signature this 21st day of November, 1919.

J. BEN. FAULKNER.